July 28, 1970  E. R. HAMILTON  3,521,750
LABORATORY SIFTER
Filed May 31, 1968  2 Sheets-Sheet 1

INVENTOR
EDWARD R. HAMILTON
BY Beall and Jones
ATTORNEYS

United States Patent Office 3,521,750
Patented July 28, 1970

3,521,750
LABORATORY SIFTER
Edward R. Hamilton, Austin, Tex., assignor to Rainhart Company, Austin, Tex., a corporation of Texas
Filed May 31, 1968, Ser. No. 733,442
Int. Cl. B07b 1/08
U.S. Cl. 209—237                                        5 Claims

ABSTRACT OF THE DISCLOSURE

A sifting apparatus using standard laboratory sieves, mechanically duplicates the results of hand sieving. A pair of power driven rollers of sufficient length to accommodate the desired number of stacked sieves are inclined at approximately 45° and laterally spaced to receive sieves of the desired diameter. The preassembled stack of sieves is laid on the rollers, with the center of the bottom sieve pan resting on a free turning turntable. Rotation of the rollers causes the stack of sieves to rotate and the specimen is then poured into the open upper end. Means are provided to repeatedly tap the lower sieves to prevent clogging of the sieve meshes.

BACKGROUND OF THE INVENTION

The present invention relates, in general, to apparatus for classifying granular material and, more particularly, to sifting apparatus for receiving a stack of standard laboratory sieves and rotating the stack in such a manner that the granular material is separated and classified according to particle size to thereby produce accurate test results which will duplicate the results of hand sifting.

One common classification for dry granular substances such as foundry sand, highway soils, sands, clays and aggregates is the distribution of particle size. This distribution is most often determined by measuring the percentage of weight of the material retained on each of a plurality of sieves arranged in decreasing fineness, whereby each sieve retains that material which cannot pass through its respective screen. The sieves are constructed by mounting standard sieve wire or mesh as a filter and closure within a hoop or frame. The hoop is generally 8 inches in diameter, although 6, 10 or 12 inch diameters are sometimes used. Typically, the height of each sieve hoop is 2 inches. The sieve hoops are shaped in a manner to permit them to be stacked vertically, so that a sample, introduced at the top, will filter down through the stack. Starting with a spun pan, the sieves are stacked with the smallest desired mesh at the bottom to the largest mesh at the top. A typical stack may contain from 6 to 12 classification sizes with mesh ranges from No. 200, which will pass only fine dust, to perhaps 1½ inch openings, which will pass coarse crushed rock.

Since mere gravity flow will not produce the desired sifting, numerous automatic sieve shakers have been devised to impart various motions to sieve columns in order to agitate the material within the sieves and insure proper filtering action. Originally, the sieves were hand shaken one at a time to remove successive sizes of particles starting with the largest, and the A.S.T.M. still spells out the hand method as standard, requiring that all mechanical shakers duplicate the results so obtained. It was the laborious, time-consuming procedure of hand sieving, together with the necessity for highly trained personnel, that lead to the development of mechanical sieve shakers, and the efficiency of such shakers is still determined by hand finishing the batch in each successive sieve. Since the motions used in hand sifting are complex and differ widely with the various sizes of mesh, the mechanical actions developed in the prior art in an attempt to obtain duplicate results are many and varied.

The A.S.T.M. standards describe typical hand motions to achieve the desired separation; however, the descriptions of these motions cannot encompass the wide variations in sieve manipulation required to effectively handle the infinite variety of particle sizes and shapes. Particles are seldom spherical and the openings in the wire mesh are rarely square or uniform in size. Therefore, the particles must be given several chances to pass through the holes in the mesh. This is attempted in the prior art devices, which generally clamp a stack of vertically disposed sieves and manipulate them in some combination of swinging, bumping, gyrating or jogging motions without significantly altering the verticality of the stack. This type of mechanization of hand motions is an attempt to simultaneously provide all of the various motions required for the different sizes of materials in a complete stack of sieves having a full range of meshes. Such combinations of motions result in a poor compromise, because the correct manipulation for one size of aggregate is often incompatible with another.

When sifting a batch of granular material, the larger sizes (from ¾ inch and up) tend to lodge in the mesh like eggs in a crate. In hand sieving the aggregate is gently tossed out of the mesh and lands in attitudes and configurations whereby the particles are given numerous chances to pass through the holes in the mesh. In known mechanical devices, a fairly sharp vertical action is required to move the aggregate out of the mesh. In some cases, a vertical motion on the order of ¾ inch has been used to assure removal of all the particles from the mesh. The difficulty is, that this motion causes the particles to become more severely wedged in the mesh and thus to clog the screen before the individual particles have had sufficient chance to pass through. Cleaning the screen of the particles which become wedged into the mesh as a result of this type of operation is difficult, time consuming, frustrating and quite often destructive of the mesh.

The middle range of granular material, around ⅜ inch in diameter, require no more than a simple flow across the screen to work satisfactorily, and thus in hand sieving, the tossing motion required for larger sizes is not used. Mechanical devices which shake a stack of sieves in the manner required for the larger size aggregates will, therefore, also shake the middle range material in the same manner. Since this type of shaking not only is unnecessary for the middle ranges, but causes particle wedging quite as pronounced as with the larger aggregate, this operation impedes, rather than enhances, the sifting process. Further, this wedging of particles in the middle range meshes slows down the sieve cleaning, for there are many more holes to be cleaned, and the problems are compounded.

The compound motions devised by the prior art to meet the requirements of various size particles have presented additional problems, in that the resulting machines often severely decompose the sample and the mesh itself during sieving, and, as well, cause the mesh to become clogged. Some machines produce good results at the coarse end and poor results at the fine end, or vice versa, but generally the overall results do not meet the required standards. Further, operating times of many of the devices are relatively long, and as a consequence the materials are further abraded, producing even poorer test results.

In tacit admission of the inadequacies of attempting to duplicate hand motion in sieve shakers, the prior art has attempted to solve the problem of particle separation through the use of horizontal drum screens wherein the mesh is mounted in the circumference of the rotating cylinder. No walls are used between sections, but the cylinder is inclined slightly to control the time of travel of the material through the rotating cylinders. Grading is accomplished by first removing the fine material and then in subsequent steps removing the coarser materials.

The length of time that the material takes to pass any one screen is arbitrarily assumed to be adequate sieving, but this approach is entirely unsatisfactory for laboratory type measurments in that there is nothing to prevent the fine aggregate which fails to fall through the fine mesh screen from passing to the next coarser size mesh.

SUMMARY OF THE INVENTION

It is therefore an object of the present invention to overcome the difficulties experienced in the prior art by providing a sifting apparatus which takes a new approach to the problem of laboratory sifting.

It is a further object of the present invention to provide a mechanical sifter having a unique motion which does not attempt to mechanize hand motions, yet which will duplicate the results of hand sieving.

The present invention provides an apparatus which produces a rolling motion in a stack of standard laboratory sieves, the rolling motion ocurring at a critical angle of the sifter whereby the aggregate material is caused continuously to flow over the screen. The constantly rotating sieves present every portion of their mesh repeatedly to the material, which is rolled and agitated by the action of the moving mesh. Since most of the material passes through the mesh on the "uphill", or upwardly moving, portion of the sieve, when the relative velocities of the material and the screen are fairly similar, abrasion of the sample is reduced, and there is reduced wear on the sieve itself. The rolling motion permits quicker sieving than with prior devices and the simplicity of the apparatus permits introduction into the sieve stack of bulk materials during sieving. Further, the apparatus permits simplified loading of the sieve stack onto the rolling mechanism, and the noise level of operation is quite low.

The apparatus comprises a pair of power driven synchronized rollers of sufficient length to accommodate the desired stack of sieves. The rollers are inclined at approximately 45° and are laterally spaced to receive the desired diameter sieves. The preassembled stack of sieves is laid on the cradle formed by the two parallel rollers, with the bottom-most sieve resting on a rotatable turntable. Where sieves finer than No. 50 are used, coating or clogging of the mesh may occur, and an occasional tap on the rim of the finer sieves may be used to free the material. To accomplish this, a clapper is mounted on a pivoted lever arm, and a cam mechanism is arranged to cause the clapper periodically to strike the fine mesh sieves as they rotate.

BRIEF DESCRIPTION OF THE DRAWINGS

The novel features which are characteristic of the present invention are set forth with particularity in the appended claims, but the invention and its objects will be understood more clearly and fully from the following detailed description, taken in conjunction with the accompanying drawings in which:

DESCRIPTION OF THE PREFERRED EMBODIMENT

Figure 1:
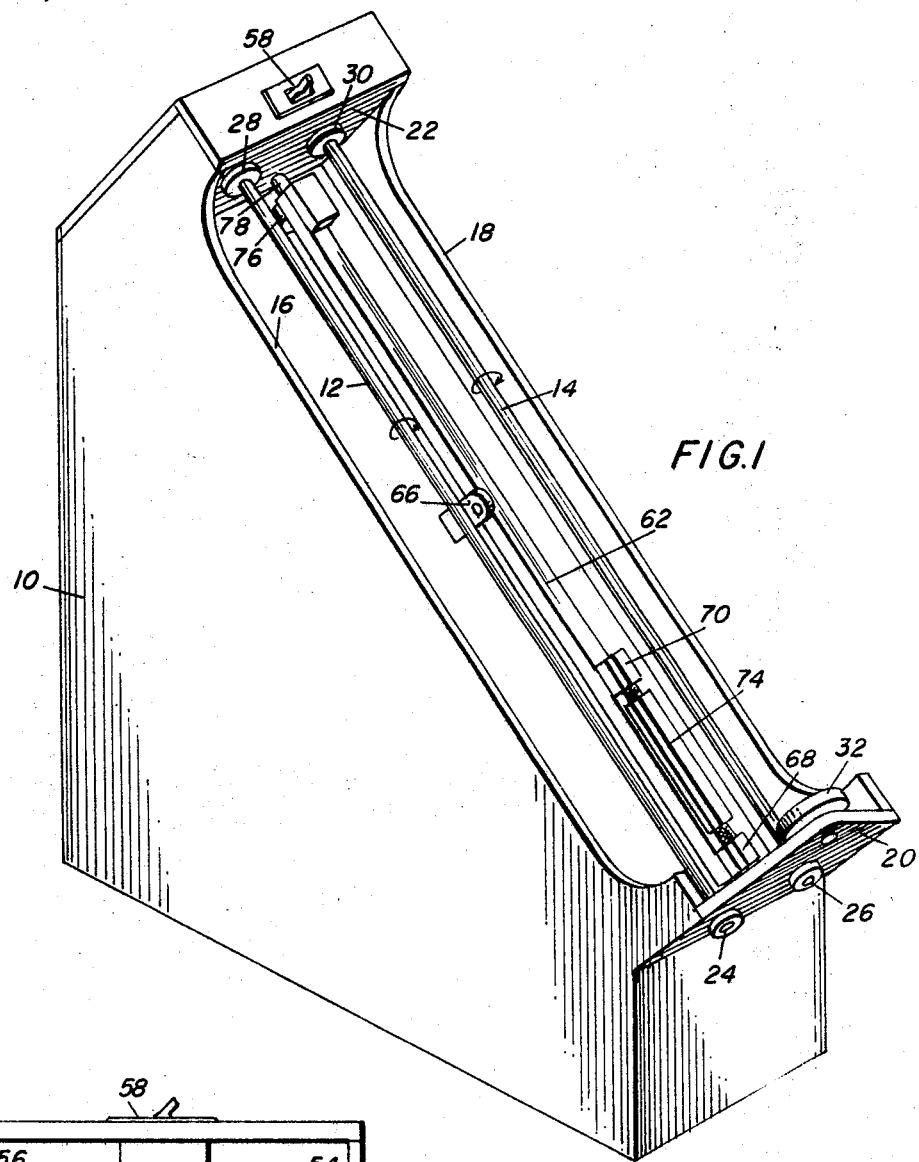
FIG. 1 is a perspective view of a sifter apparatus made in accordance with the present invention.
Figure 4:
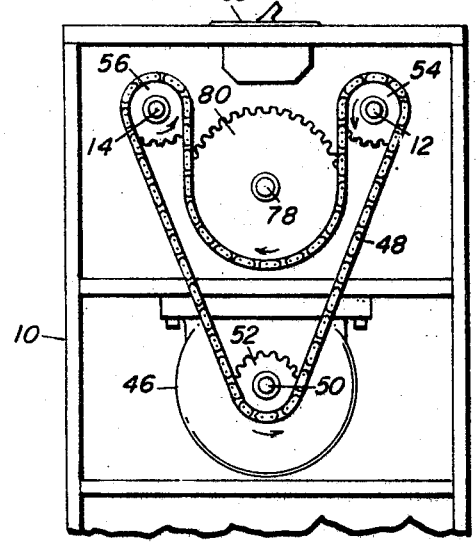
FIG. 4 is an end view of the apparatus of FIG. 1 showings its drive mechanism.

Turning now to a consideration of FIG. 1 of the drawings, there is illustrated a sifter apparatus in accordance with the invention which comprises a housing 10 carrying a pair of parallel, power driven, synchronized trunnions, or rollers, 12 and 14. The rollers preferably are covered with rubber or a similar material in order to provide a good driving contact with the sieves which they carry. Rollers 12 and 14 are mounted in a channel, or cradle, portion formed in the upper part of the housing and defined by side walls 16 and 18 and end walls 20 and 22, the rollers 12 and 14 being journalled in or otherwise suitably carried by end walls 20 and 22. As illustrated in this embodiment, parallel rollers 12 and 14 are supported in end wall 20 by journal bearings 24 and 26, respectively. Similarly, rollers 12 and 14 extend through end wall 22 and are supported therein by journal bearings 28 and 30.

The length of the rollers is such as to accommodate the desired number of stacked sieves, and preferably they are long enough to receive at least 12 standard size sieves. It will be noted that the housing supports the rollers at approximately a 45° angle with the vertical, for reasons to be discussed below, with the end walls 20 and 22 being similarly angularly formed on the housing to accommodate the rollers. The spacing between rollers 12 and 14 is such that the rollers will receive and support a stack of sieves, in the manner illustrated in FIG. 3, for rotary motion, and is such that sieves of any conventional diameter can be supported and driven.

A freely rotating turntable 32 is mounted in the lower end wall 20, near the lower end of the trunnions, with its axis parallel to the trunnions and concentric with the center line, or axis of rotation, of the stack of sieves carried by the rollers. The turntable may be carried by a shaft 34 mounted in suitable journal means 36 in the end wall 20, and it will be apparent that a plurality of such journal means may be provided to permit adjustment of the turntable location for alignment of shaft 34 with the center line of the sieve stack being used. The center of the pan bottom of the lower-most sieve in the stack rests on the turntable to restrain the sieves from sliding downwardly.

Figure 2:
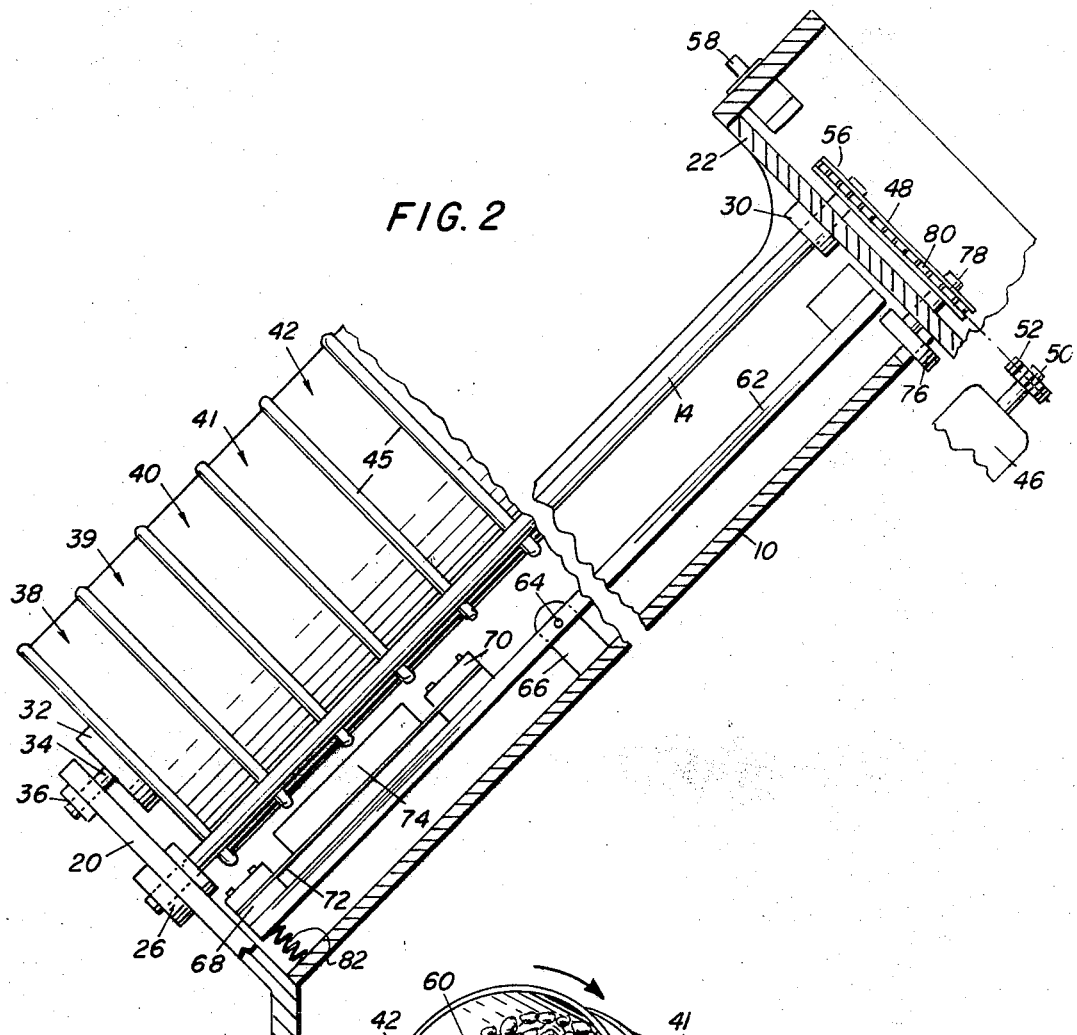
FIG. 2 is a side view of the apparatus of FIG. 1 with the near side wall of the housing removed for visibility.
Figure 3:
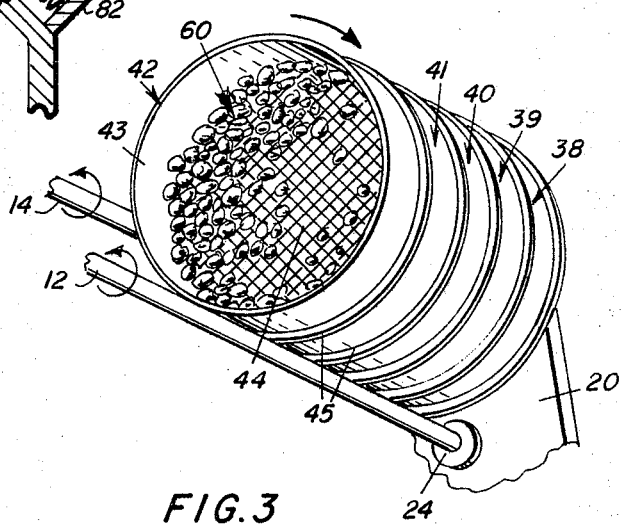
FIG. 3 is a perspective top view showing a stack of sieves mounted on the apparatus of FIG. 1.

As shown in FIGS. 2 and 3, sieves 38, 39, 40, 41 and 42 make up a stack which is supported by the sifter apparatus. By virtue of the angular position of rollers 12 and 14 and by reason of the type of motion imparted to the sieves, no clamps or other holding fixtures are required with the present device to restrain the stack, thus permitting easy loading and unloading of the sifter apparatus and quick access to the individual sieves. As shown in FIG. 3, the typical sieve 42 comprises a cylindrical frame, or hoop, 43 closed at or near one end by a mesh 44. Each hoop is formed with a flange, or shoulder, portion 45 at its lower edge adapted to receive the upper edge of an adjacent sieve, whereby the sieves may be stacked.

The rollers preferably are driven by an electric motor 46 (FIGS. 2 and 3) mounted within the housing 10 and connected to rollers 12 and 14 by means of a belt or chain drive 48. Suitable step down gearing (not shown) may be provided for speed adjustment between the motor shaft and a drive shaft 50 on which is mounted a drive wheel 52. Drive wheel 52 may be a V-belt pulley, a toothed sprocket, or the like, depending upon whether a belt, chain drive or equivalent drive means is to be used. Corresponding driven wheels 54 and 56 are mounted on the ends of rollers 12 and 14, respectively, which extend through end wall 22, and it will be apparent that these driven wheels may also be V-belt pulleys or sprocket wheels, corresponding to the drive means. Switch means 58 may be conveniently located to control operation of motor 56. The motor speed or the drive ratio may be adjusted to produce a desired rate or rotation in the sieves carried by rollers 12 and 14. Although the precise rate of rotation is not critical, excellent results have been obtained by a rotation speed which produces a circumferential velocity of the sieves of approximately 65 feet per minute.

In operation, the stack of sieves having meshes graded from fine to coarse from the bottom to the top of the stack is placed on the rollers 12 and 14 with the pan bottom of the lowermost sieve resting on turntable 32. The motor is energized and the rotation of rollers 12 and 14 causes the stack of sieves to rotate about its axis. The specimen of granular material which is to be graded may then be poured into the open upper end of the sieve stack while the sieves are rotating. The constantly rotating sieves present every portion of their mesh repeatedly to the material, for as the loaded screen rotates, the bulk of the material accumulates on the side of the screen which is moving upwardly, as diagrammatically illustrated in FIG. 3. As the mesh passes under the bulk of the non-uniformly distributed material, the material is rolled and agitated and thus presented with numerous opportunities to pass through the mesh. Most of the material which is capable of passing through a given mesh will pass through it on the upwardly moving part of the mesh, where the relative velocities of the material and the screen are fairly close. Any part of the aggregate which is carried away from the bulk of the material will be carried away near the top center portion of the mesh 60 (FIG. 3). This material then tumbles down the descending side of the mesh and is carried back to the pile of material, but little passes through the mesh during this part of the motion since it is generally moving too fast to pass through. By placing the rotating stack at approximately a 45° incline, a gentle flowing of the material across the screen is obtained, and this motion minimizes the wedging of the granular material which is characteristic of prior art devices. Further, abrasion of the sample and the screen is greatly reduced and the noise level of the operation is low. It has been found, however, that if the degree of incline varies too much from the optimum value, operation of the device is impaired. If the sieve stack is too near vertical, the material nests in the wire mesh and fails to flow over the screen. If the stack is too near the horizontal, the flowing material will not move through the mesh. Thus, the degree of incline is critical to proper operation of the sifter apparatus; a deviation of less than 40° or more than 55° from the vertical makes the apparatus virtually inoperable for the proper grading of a wide range of particle sizes, but between these limits, satisfactory operation is obtained. Of course, if only a small range of particle sizes are to be sifted, it is possible to obtain proper operation somewhat outside this range, but for practical purposes, the inclination should be as described.

If no sieves finer than No. 30 are required, the apparatus as described above will provide a smooth and free flowing operation. However, with sieves finer than this, and particularly where the openings are less than No. 50 coating or clogging occurs even though the material being sifted is cohesionless, i.e., dry. In this instance, an occasional light tap on the rim of the finer sieves with a hardwood block will free the material. To provide this tapping action, a lever arm 62 is mounted in housing 10 extending between end walls 20 and 22 within the channel defined by the side walls 16 and 18. This lever arm is parallel to rollers 12 and 14, and is located between and below the rollers (see FIGS. 1 and 2). The lever arm is pivotally mounted, as on a shaft 64 carried by a suitable bearing housing 66 mounted in the channel of housing 10. At the lower end of lever arm 62 are a pair of spaced mounting blocks 68 and 70 between which extends a flexible strap 72. Strap 72 preferably is clamped between the two halves of each of mounting blocks 68 and 70, with the clamping action being provided by suitable screws or bolts passing through the mounting blocks. A clapper 74 is carried by and attached to the strap by any suitable means. Various alternative methods of holding the clapper in place will be apparent; for example, clapper 74 may be made in two halves in the manner of mounting blocks 68 and 70, with the strap passing between the two halves and clamped therebetween by screws or bolts. Another alternative would be to provide short lengths of flexible strap extending between each of the mounting blocks and the corresponding end of the clapper. The flexible attachment of the clapper has been found to provide the desired tapping action without interfering with the rotation of the sieves.

The lever arm is driven in an oscillatory motion about its pivot point 64 so that clapper 74 is moved toward and away from the sieve stack. This motion is obtained by means of a suitable cam 76 which may, for example, be located at the upper end of the lever arm. This cam may be mounted on a shaft 78 extending through and journalled in the upper end wall 22, and may carry on its opposite end a driven wheel 80. Wheel 80 is connected to the drive motor 46 by way of belt or chain drive 48, and thus may be a V-belt pulley, sprocket wheel, or the like.

A compression spring 82 is located beneath the lower end of the lever arm 62. Rotation of cam 76 compresses the spring, which then serves to drive the clapper against the sieve stack when the upper end of the lever ar mis released by the cam. The repetition rate of the clapper motion, which depends on the speed of rotation of cam 76, is not critical, but it has been found that by lightly striking the sieve stack approximately 145 times per minute satisfactory operation is obtained. The firmness with which the sieves are struck may be varied by changing the size of the cam, the strength of the spring, the flexibility of strap 72, or the like. Again, it will be apparent that the rate of striking the sieves can be varied by changing the size of the driven wheel 80 or by varying the speed of motor 46.

The continuous rotation of the sieve stack, accompanied by the rapid, light tapping of the lower sieves where necessary, with the sieve stack inclined at a critical angle produces a unique sifting motion not found in prior devices and which accurately and quickly separates according to size granular material to be tested for particle size distribution. Although it does not duplicate hand sifting motions, nevertheless the subject device produces results which quickly and economically duplicate the results of hand sieving. It will be apparent that modifications can be made in the particular structural features of the invention without departing from the scope of the invention. For example, in place of the motor drive, a hand operated crank operation may be provided. Similarly, direct gear drive may be provided in place of the belt or chain drive mechanism. Other variations and modifications will be apparent to those skilled in the art, and it is therefore desired that the foregoing description be taken as illustrative and limited only by the following claims.

I claim:

1. An apparatus for separating granular aggregates by particle size using a plurality of sieve means arranged in a stack according to mesh size comprising:
    (a) a housing;
    (b) first and second parallel spaced rollers carried by said housing and receiving said stack, said rollers carrying said stack so that the axis of said stack is inclined at an angle approximately 45° from the vertical;
    (c) rotatable tables means on said housing for holding said stack on said rollers, said table and said rollers comprising the sole support of said stack; and
    (d) means for rotating said stack about said inclined axis, whereby the rotation of said stack about said inclined axis produces a non-uniform distribution on each sieve of the aggregate deposited thereon.

2. The apparatus of claim 1, further including means for lightly and repeatedly transversely tapping the lowermost sieves in said stack to prevent clogging of fine mesh sieves, said rotation and tapping of said sieves in said stack being the only motions imparted thereto in separating said granular aggregates.

3. The apparatus of claim 1, further including
    (a) a lever arm pivotally mounted parallel to said rollers and spaced from said stack;
    (b) clapper means carried by said lever arm adjacent said stacked sieves for transversely stacking selected sieves; and (c) means for repeatedly driving said clapper means against said selected sieves.

4. The apparatus of claim 3, wherein said means for driving said clapper includes rotating cam means at one end of said lever arm.

5. The apparatus of claim 4, further including motor means for synchronously rotating said rollers and said cam means.

References Cited

UNITED STATES PATENTS

| 804,858 | 11/1905 | Johnson | 209—382 X |
|---|---|---|---|
| 1,290,531 | 1/1919 | Evert | 209—237 |
| 1,291,371 | 1/1919 | Bell | 209—237 |
| 2,029,848 | 2/1936 | Wettlaufer | 209—237 |
| 1,198,395 | 9/1916 | Marshall | 209—280 X |
| 1,863,291 | 6/1932 | Weston | 209—237 X |

FOREIGN PATENTS 51,032  4/1890  Germany.

OTHER REFERENCES

Schalk, German application 1,071,457, printed December 1959.

FRANK W. LUTTER, Primary Examiner

U.S. Cl. X.R.

209—315, 351, 369, 382